(12) United States Patent
Hoover et al.

(10) Patent No.: US 11,300,053 B2
(45) Date of Patent: Apr. 12, 2022

(54) PASSIVE FLAME ARRESTOR SYSTEM

(71) Applicant: HONEYWELL INTERNATIONAL INC., Morris Plains, NJ (US)

(72) Inventors: Robert Hoover, Phoenix, AZ (US); Jeffrey Kohn, Mesa, AZ (US); Daniel Hand, Tempe, AZ (US); James Unsworth, Mesa, AZ (US); Seth Bullington, Mesa, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 231 days.

(21) Appl. No.: 16/591,128

(22) Filed: Oct. 2, 2019

(65) Prior Publication Data

US 2021/0102497 A1 Apr. 8, 2021

(51) Int. Cl.
*F02C 7/25* (2006.01)
*F02C 7/14* (2006.01)
*A62C 4/00* (2006.01)
*B64D 41/00* (2006.01)
*B64D 45/00* (2006.01)

(52) U.S. Cl.
CPC ............ *F02C 7/25* (2013.01); *A62C 4/00* (2013.01); *F02C 7/14* (2013.01); *B64D 41/00* (2013.01); *B64D 2045/009* (2013.01); *F05D 2220/50* (2013.01); *F05D 2260/213* (2013.01)

(58) Field of Classification Search
CPC .... A62C 4/00; A62C 4/02; A62C 3/08; F02C 7/25; B64D 41/00; B64D 2045/009; B64D 33/10; F05D 2260/213
See application file for complete search history.

(56) References Cited

U.S. PATENT DOCUMENTS

| | | | | |
|---|---|---|---|---|
| 2,613,144 A | * | 10/1952 | Carnahan | A62C 4/02 48/192 |
| 5,265,408 A | * | 11/1993 | Sheoran | B64D 33/08 60/262 |
| 5,655,359 A | * | 8/1997 | Campbell | F02C 7/14 60/772 |
| 6,092,360 A | | 7/2000 | Hoag et al. | |
| 6,644,961 B2 | | 11/2003 | Brooker | |
| 6,651,929 B2 | * | 11/2003 | Dionne | B64D 41/00 244/57 |
| 6,811,122 B2 | | 11/2004 | Aramburu et al. | |

(Continued)

FOREIGN PATENT DOCUMENTS

| | | |
|---|---|---|
| EP | 3305372 A1 | 4/2018 |
| GB | 2555379 A | 5/2018 |
| JP | 2005273528 A | 10/2005 |

OTHER PUBLICATIONS

Hariram, Sham, "Fire Protection: Engines and Auxiliary Power Units," www.boeing.com/commercial/aeromagazine/articles/2010_q4/pdfs_AERO_2010_Q4_article3.pdf.

*Primary Examiner* — Alain Chau
(74) *Attorney, Agent, or Firm* — Lorenz & Kopf, LLP

(57) ABSTRACT

A flame arrestor system includes a heat exchanger through which a cooling gas flow stream is directed. A zone adjacent the heat exchanger is susceptible to possible flame and through which the cooling gas flow stream is directed. A flame arrestor containing a passage-structure matrix is disposed between the zone and the heat exchanger to quench flame from entering the heat exchanger.

20 Claims, 4 Drawing Sheets

(56) References Cited

U.S. PATENT DOCUMENTS

| | | | |
|---|---|---|---|
| 6,942,181 B2 * | 9/2005 | Dionne | B64D 33/10 244/57 |
| 7,040,576 B2 | 5/2006 | Noiseux et al. | |
| 7,093,666 B2 | 8/2006 | Trumper | |
| 7,232,097 B2 * | 6/2007 | Noiseux | A62C 2/14 165/122 |
| 7,337,605 B2 | 3/2008 | Hagshenas | |
| 7,526,921 B2 | 5/2009 | Williams et al. | |
| 7,819,359 B2 | 10/2010 | Chaniot | |
| 7,918,081 B2 | 4/2011 | Schlichting et al. | |
| 8,079,550 B2 | 12/2011 | Brill et al. | |
| 8,245,494 B2 * | 8/2012 | DeDe | F02K 1/36 60/39.83 |
| 8,556,027 B2 * | 10/2013 | Francisco | F02K 1/46 181/213 |
| 8,763,751 B2 | 7/2014 | Starobinski et al. | |
| 8,820,045 B2 | 9/2014 | DeDe et al. | |
| 9,540,114 B2 | 1/2017 | Nager et al. | |
| 9,587,563 B2 | 3/2017 | Nesbitt et al. | |
| 9,650,149 B2 | 5/2017 | Wilcox et al. | |
| 9,850,000 B2 | 12/2017 | Tweet et al. | |
| 10,202,201 B2 | 2/2019 | Mora | |
| 10,293,195 B2 * | 5/2019 | Takahashi | B64D 37/32 |
| 2005/0151017 A1 * | 7/2005 | Noiseux | F02C 7/25 244/129.2 |
| 2005/0268593 A1 * | 12/2005 | Hagshenas | B64D 33/08 60/39.08 |
| 2006/0218934 A1 * | 10/2006 | Williams | F02C 7/045 60/785 |
| 2006/0284015 A1 * | 12/2006 | Noiseux | B64D 33/10 244/129.2 |
| 2012/0273239 A1 | 11/2012 | Brennan | |
| 2016/0152344 A1 * | 6/2016 | Palomares Mora | B64D 41/00 244/58 |
| 2016/0271431 A1 * | 9/2016 | Takahashi | A62C 3/065 |
| 2018/0156334 A1 | 6/2018 | Takeuchi | |

* cited by examiner

PASSIVE FLAME ARRESTOR SYSTEM

TECHNICAL FIELD

The present invention generally relates to flame arrestor systems, and more particularly relates to passive flame arrestors that operate with no moving parts.

BACKGROUND

In a number of applications, light weight materials are desirably used for heat exchangers. Typical applications involve vehicles where added weight may impact performance or reduce range. One such application is a gas turbine auxiliary power unit for aircraft where elevated temperatures near the unit's oil cooler are possible. The possibility of elevated temperatures, including those associated with flame, limits the types of materials that may be used for oil coolers, which may increase weight.

Accordingly, it is desirable to effectively protect a heat exchanger from undesirably high temperatures enabling the use of lighter weight materials. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a flame arrestor system includes a heat exchanger through which a cooling gas flow stream is directed. A zone adjacent the heat exchanger is susceptible to possible flame and the cooling gas flow stream is directed through the zone. A flame arrestor containing a passage-structure matrix is disposed between the zone and the heat exchanger to quench flame before entering the heat exchanger.

In a number of additional embodiments, a flame arrestor system includes a heat exchanger vulnerable to elevated temperatures and through which a cooling gas flow stream is directed. The cooling gas flow stream is directed through a zone in which flame is possible. A flame arrestor containing a passage-structure matrix is configured to quench flame. The flame arrestor is disposed between the zone and the heat exchanger, and the cooling gas flow stream is directed through the flame arrestor.

In a number of other embodiments, a flame arrestor system for an auxiliary power unit includes an oil cooler comprising an aluminum material and through which a cooling air flow stream is directed. An eductor is configured to educt the cooling air flow stream through the oil cooler and to convey combustion gases to an exhaust duct. The eductor comprises a possible flame zone. A flame arrestor containing a passage-structure matrix is configured to quench flame and is disposed between the eductor and the oil cooler. The cooling gas flow stream is directed through the flame arrestor.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, a flame arrestor system provides a mechanism that enables the use of light-weight, low melting temperature, high thermal conductivity materials for constructing a heat exchanger that is disposed in an environment in which elevated temperatures, such as those due to flame, are possible. In an exemplary embodiment, a flame arrestor system includes a flame arrestor that protects the heat exchanger and that may be located upstream, downstream, or both upstream and downstream relative to the heat exchanger. The flame arrestor may be a passive device with no moving parts to efficiently and effectively protect the heat exchanger. In an exemplary embodiment of the present disclosure as further described below, a flame arrestor system includes a heat exchanger in the form of an oil cooler through which a cooling air flow stream is directed. The cooling gas flow stream is directed through a possible flame zone disposed upstream and/or downstream from the heat exchanger. A flame arrestor unit containing a passage-structure matrix is disposed between the possible flame zone(s) and the heat exchanger to quench flame before it enters the heat exchanger.

In an exemplary embodiment described herein, the flame arrestor system may be associated with an auxiliary power unit (APU) system, but the disclosure is not limited in application to such systems. For example, other propulsion applications and other heat transfer applications may include a heat exchanger that is desirably made of lightweight material and which may be exposed to flames. Accordingly, the current disclosure is applicable to other applications including various types of propulsion engines and other non-engine systems, where protecting a heat exchanger from elevated temperatures is desirable.

Figure 1:
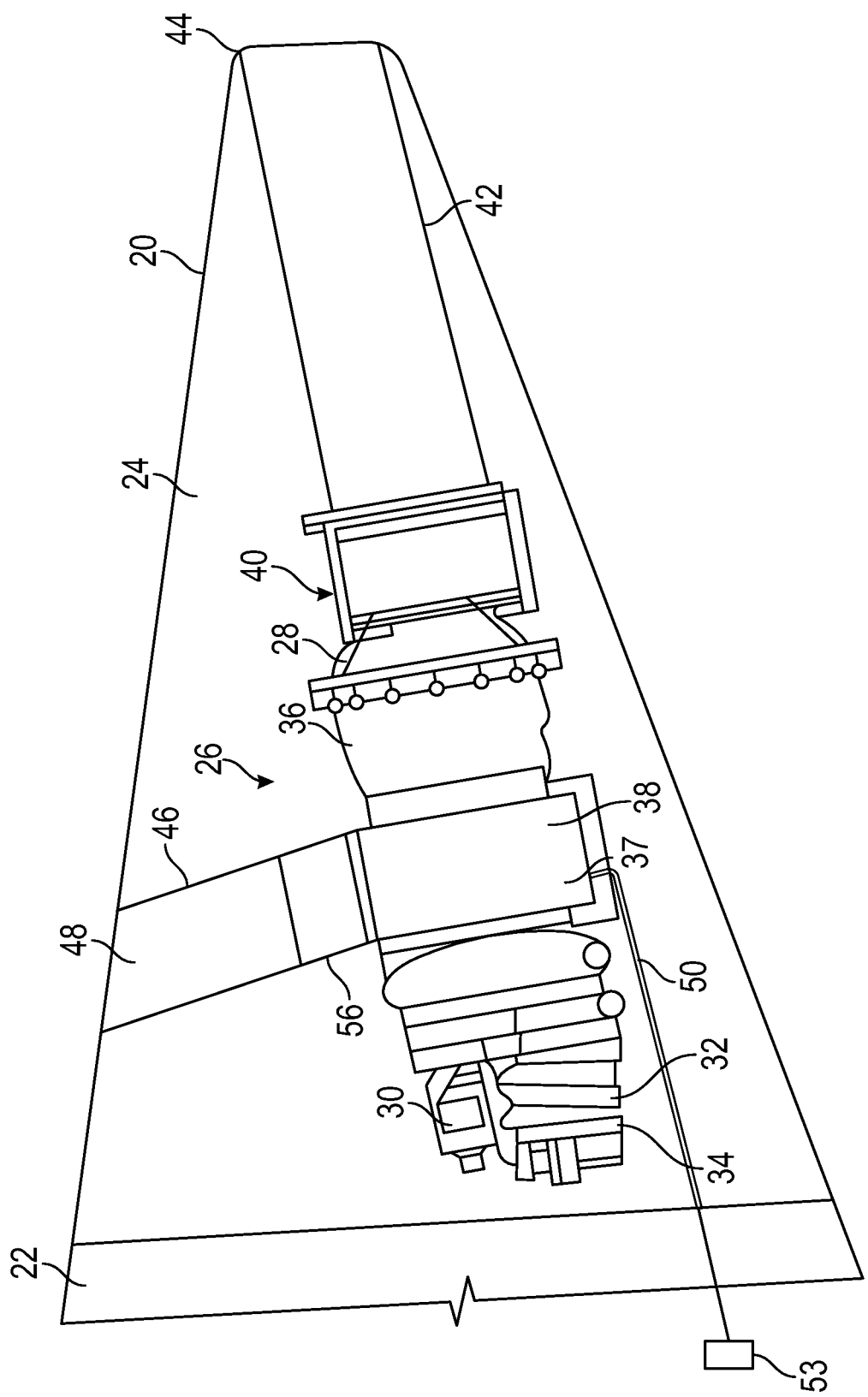
FIG. 1 is a cross-sectional illustration of a tail cone area of an aircraft including a gas turbine engine in an auxiliary power unit application, according to an exemplary embodiment.

A gas turbine APU as illustrated in FIG. 1 is housed in the tail cone 20 area of an aircraft 22. The tail cone area 20 defines a compartment 24 that houses the APU 26. The APU 26 generally includes a turbine 28 which powers the APU 26, a starter 30 for starting the APU 26, a gearbox 32 for driving various loads including a generator 34 for supplying electrical power, a load compressor 37 for supplying various pneumatic loads, a power compressor 38 for supplying air to the turbine 28, an eductor system 40 for pumping air, and an exhaust duct 42 for delivering exhaust out of the tail 44 of aircraft 22. The compressors 37, 38 receive outside air from an inlet duct 46 that extends between the APU 26 and an inlet opening 48. In the current embodiment, the opening 48 is presented through the side of the tail cone 20. The inlet opening 48 may include a door that selectively opens when the APU 26 is in operation and is closed when the APU is not in use. In addition to supplying a main flow of combustion air to the turbine 28, the compressors 37, 38 deliver, via a bleed system, compressed air for pneumatic powered systems 53 of the aircraft 22 through a supply duct 50. Accordingly, gas in the form of air is compressed by the compressors 37, 38 and delivered for separate uses including by the combustor 36 and by the systems 53. The air supplied to the systems 53 is referred to as bleed air, which is separated from the main flow going to the combustor 36 internally in the compressors 37, 38.

Figure 2:
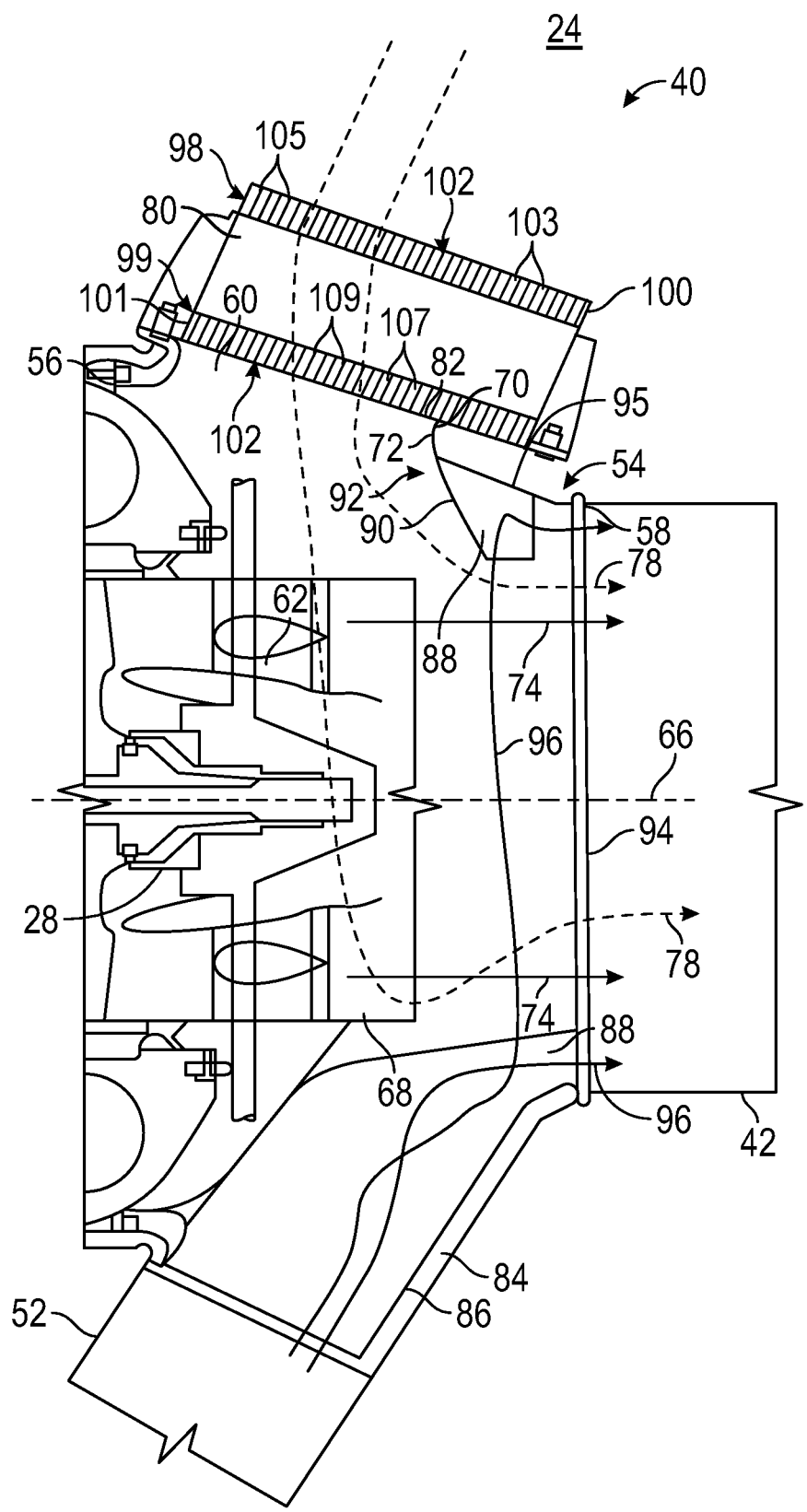
FIG. 2 is a cross-sectional illustration of an exemplary flame arrestor system for an oil cooler and eductor system, incorporated into the tail cone depicted in FIG. 1.

In an exemplary embodiment as illustrated in FIG. 2, the eductor system 40 generally includes an eductor housing 54 that connects in the APU 26 downstream of the turbine 28. An upstream inlet end 56 of the eductor housing 54 connects with the turbine 28 and a downstream exit end 58 connects with the exhaust duct 42. The eductor housing 54 defines a primary plenum 60 that is disposed circumferentially around a turbine exit nozzle 62 and extends along the longitudinal axis 66, as defined by the turbine 28. The longitudinal axis 66 is the center of rotation for the turbine 28 and of the compressors 37, 38. The turbine exit nozzle 62 delivers an exhaust gas flow stream 74 from the turbine 28 to the eductor system 40. A mixer nozzle 68 is disposed around the turbine exit nozzle 62 and extends into the primary plenum 60. The primary plenum 60 surrounds the entire circumference of the turbine exit nozzle 62 and the mixer nozzle 68 to maximize contact between high velocity exhaust gas flow stream 74 and a cooling gas flow 78 that is educted.

The eductor housing 54 includes an inlet shroud 70 which defines an inlet opening 72. The exhaust gas flow stream 74 exiting the turbine 28 flows through the eductor housing 54 from the inlet end 56 to the exhaust duct 42 at a high velocity and with a drop in static pressure. As the exhaust gas flow stream 74 passes through the eductor housing 54, cooling air flow stream 78 is drawn through the inlet opening 72 into the primary plenum 60 and is mixed with the exhaust gas flow stream 74. An air/oil heat exchanger in the form of an oil cooler 80 is disposed at the outboard end 82 of the inlet shroud 70, and oil for lubricating the APU 26 is passed through the oil cooler 80. Accordingly, the cooling air flow stream 78 provides an oil cooling function for the APU 26. The cooling air flow stream 78 is drawn from the compartment 24. The resulting air flow through the compartment 24 provides an additional cooling function for the compartment 24 and for the exterior surfaces of the APU 26 therein. The cooling air flow stream 78, when mixed with, and entrained in, the exhaust gas flow stream 74 also cools the exhaust gas stream entering the exhaust duct 42. A higher rate of cooling air flow stream 78 provides greater cooling and is therefore desirable. The oil cooler 80 is desirably made of a lightweight material such as aluminum or an aluminum alloy and is therefore vulnerable to elevated temperatures.

The eductor housing 54 includes a duct inlet 84 which defines an inlet opening 86 and which is connected with the surge duct 52. This opens the surge duct 52 to a secondary plenum 88, which is disposed circumferentially around primary plenum 60, adjacent the exit end 58 of the eductor housing 54. The secondary plenum 88 extends along the longitudinal axis 66 of the turbine 28, generally a shorter distance than the primary plenum 60. Excess air from the load compressor 37 is delivered through the surge duct 52 to the secondary plenum 88. It should be appreciated that as indicated above, in some embodiments the secondary plenum 88 may receive bleed air through a duct from the power compressor 38, rather than surge air delivered through the surge duct 52 from the load compressor 37. Similar to load compressor air, bleed air may be utilized for pneumatic power features of the aircraft 22 such as cabin pressurization, pneumatic actuators, air motors, and pressurizing containers. Accordingly, excess bleed air may be exhausted through the secondary plenum 88 in those embodiments. In embodiments that use bleed air, the load compressor 37 may be omitted from the APU 26.

The oil cooler 80 generally includes components made of aluminum and as such is vulnerable to elevated temperatures such as those encountered in flame situations. In some embodiments, the cooling fluid circulated through the oil cooler 80 may be flammable. The APU compartment 24 may be a possible flame zone, and therefore may expose the oil cooler 80 and its cooling fluid to undesirably high temperatures. To avoid this situation, a flame arrestor 98 is disposed adjacent the oil cooler 80 in the cooling air flow stream 78 on the upstream side. Cooling air drawn in through the oil cooler 80 must first pass through the flame arrestor 98. The flame arrestor 98 includes a housing 100 that channels the cooling air flow stream 78 into the oil cooler 80 and that contains a flame quenching material formed in a passage-structure matrix 102. The flame arrestor 98 operates by removing heat from any potential flame that attempts to propagate through the relatively long and narrow passages of the passage-structure matrix 102. The structure of the passage-structure matrix 102 is made of metal, such as steel, a ceramic, or other heat-conductive material. In this embodiment, the flame arrestor 98 is a passive device with no moving parts. Any flame attempting to move through is quenched by heat transfer to the structure of the passage-structure matrix 102. During typical operating conditions, the flame arrestor 98 is constructed to allow a relatively free flow of the cooling air flow stream 78, and even in the presence of flame, allows the cooling air to flow while quenching any flames that are present prohibiting them from reaching the oil cooler 80. Accordingly, operation of the APU 26 may continue as the flames are quenched.

In this embodiment, a second flame arrestor 99 is positioned between the oil cooler 80 and the eductor inlet shroud 70. The exhaust duct 42 may be another possible flame zone, and therefore may expose the oil cooler 80 to undesirably high temperatures. To avoid this situation, a flame arrestor 99 is disposed adjacent the oil cooler 80 in the cooling air flow stream 78, on the downstream side. The flame arrestor 99 includes a housing 101 that channels the cooling air flow stream 78 from the oil cooler 80 into the inlet shroud 70 and that contains a flame quenching material formed in a passage-structure matrix 102. The flame arrestor 98 operates by removing heat from any potential flame that attempts to propagate from the exhaust duct 42 through the relatively long and narrow passages of the passage-structure matrix 102. The structure of the passage-structure matrix 102 is made of metal, such as steel, a ceramic, or other heat-conductive, fire resistant material. The flame arrestor 99 is a passive device with no moving parts. Any flame attempting to move through is quenched by heat transfer to the structure of the passage-structure matrix 102. During typical operating conditions, the flame arrestor 98 is constructed to allow a relatively free flow of the cooling air flow stream 78, and even in the presence of flame, allows the cooling air to flow while quenching any flames that are present prohibiting them from reaching the oil cooler 80. Accordingly, operation of the APU 26 may continue as the flames are quenched.

The passage structure matrix 102 in the flame arrestor 98 includes passages 103 and a structural matrix 105. The passage structure matrix 102 in the flame arrestor 99 also includes passages 107 and a structural matrix 109. In this embodiment, the passages 103, 107 are channel-like and the structural matrices 105, 109 are wall-like structures that create a matrix of the various defined passages 103, 107. In general, a passage-structure matrix 102 is a device constructed from a structure laid out in a matrix that defines passages. The device is passive, meaning it has no moving parts. The passages are designed to quench flame without allowing it to pass through the flame arrestor 98, 99. The structural matrix may be uniform or non-uniform in construction. In a number of embodiments, the passage-structure matrix 102 in the flame arrestor 98 may be in a different configuration than the passage-structure matrix 102 in the flame arrestor 99. In a number of embodiments, only the flame arrestor 98 is included without the flame arrestor 99. In a number of other embodiments only the flame arrestor 99 is included without the flame arrestor 98.

Figure 3:
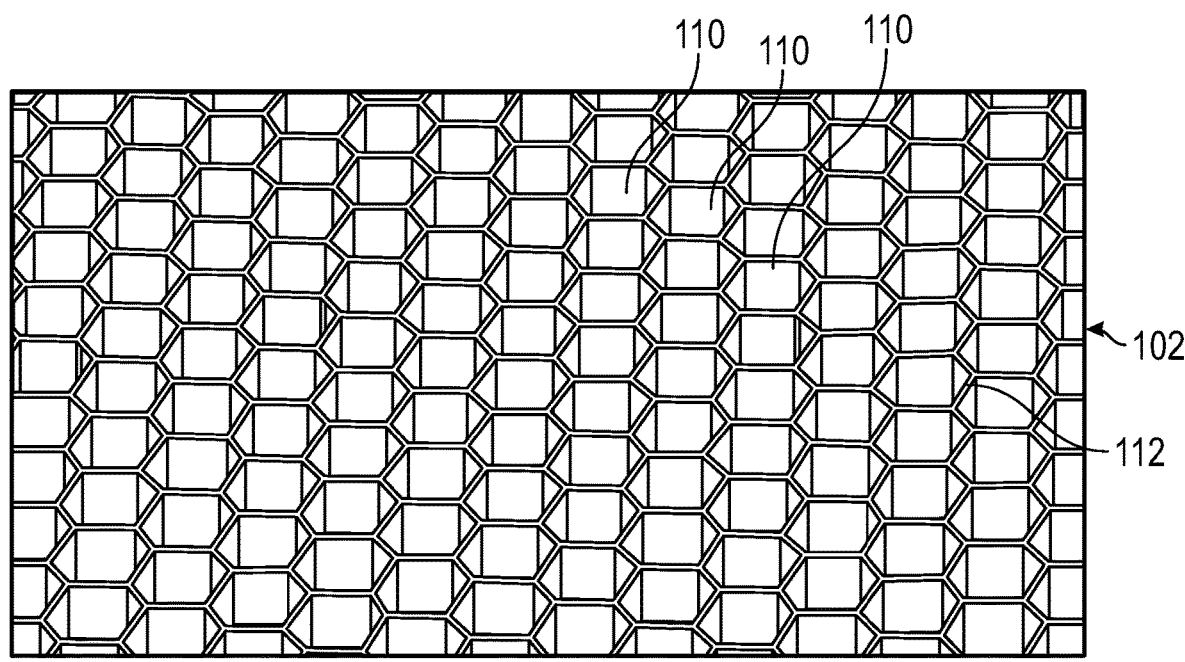
FIG. 3 is a schematic illustration of a honeycomb-type passage-structure matrix for the flame arrestor system of FIG. 2, according to an exemplary embodiment.

FIG. 3 illustrates an example of the passage-structure matrix 102 embodied as a honeycomb-like structure with passages 110 defined by a structural matrix 112 formed as elongated hexagonal cells. The passages 110 extend straight through the passage-structure matrix 102 so that the cooling air flow stream 78 passes through with low pressure loss. Flames entering the cells through the passages 110 are quenched as their heat is transferred to the structural matrix 112 making continued propagation impossible. In other embodiments, the cells may take another shape such as square, rectangular, round, curved, or other shape.

Figure 4:
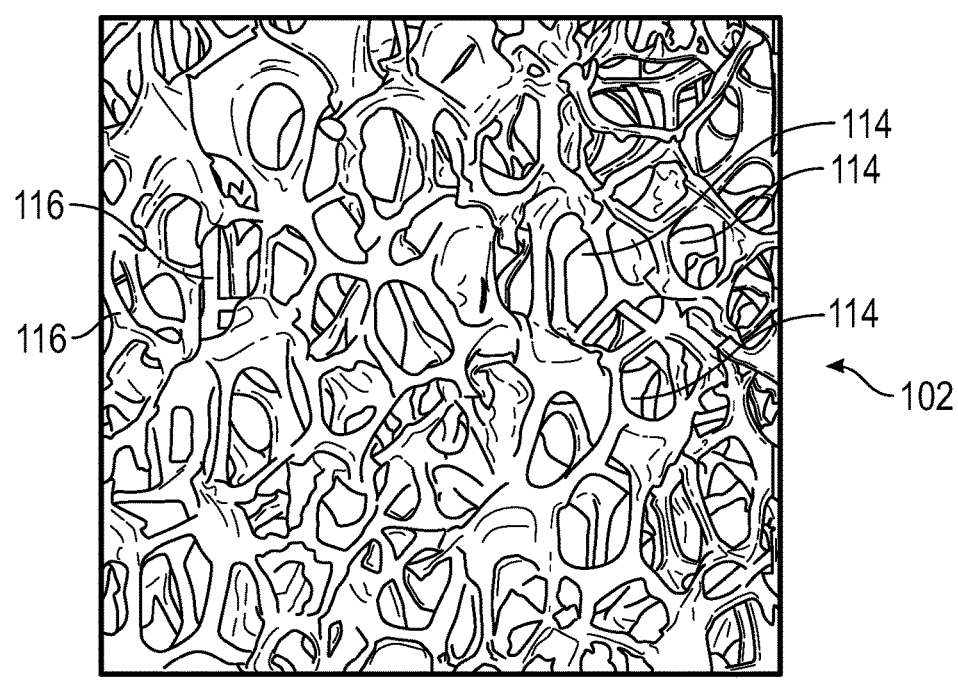
FIG. 4 is a schematic illustration of a micro-truss foam passage-structure matrix for the flame arrestor system of FIG. 2, according to an exemplary embodiment.

FIG. 4 illustrates another example of the passage-structural matrix 102 embodied as a micro-truss foam material with passages 114 defined by a structural matrix 116 of a three-dimensional ordered open-cellular microstructure foam material comprising a heat conductive material such as stainless steel or a ceramic in an interconnected network of ligaments that formed around randomly packed cells. The passages 114 extend through the structural matrix 116 by means of a tortuous path through the cells.

Figure 5:
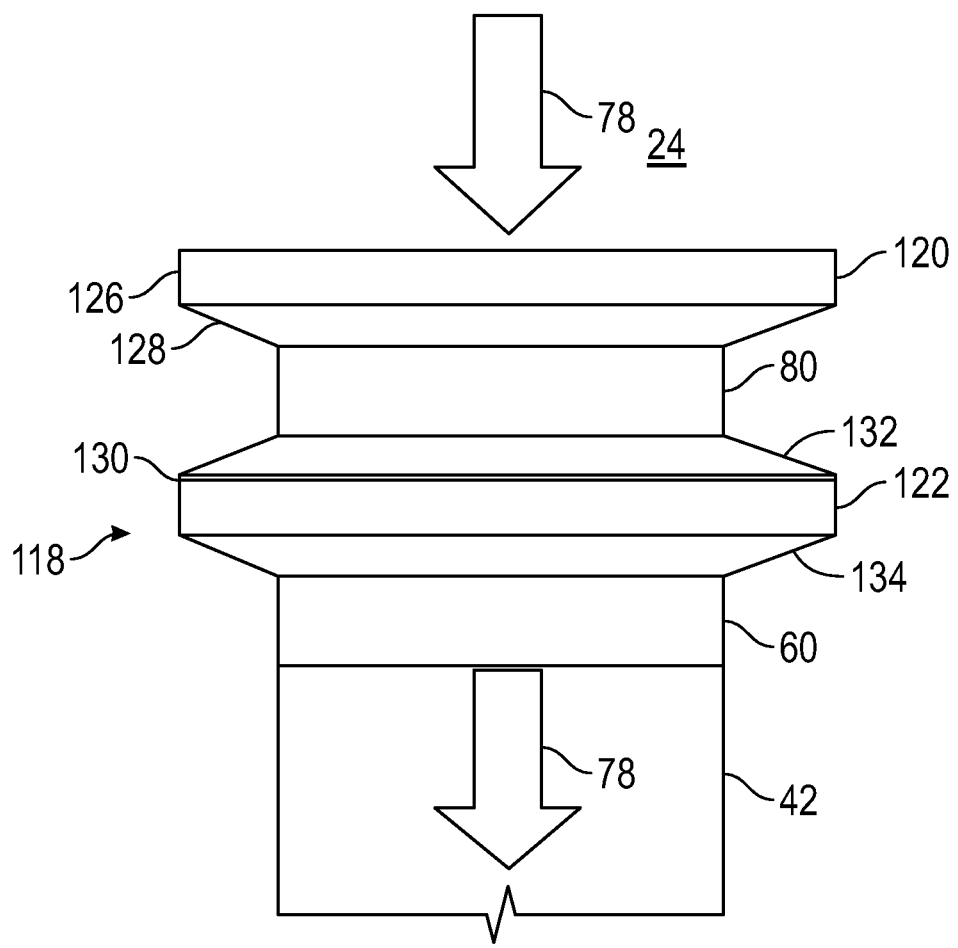
FIG. 5 is a schematic illustration of a flame arrestor system, according to an exemplary embodiment.

The oil cooler 80 and the eductor primary plenum 60 are schematically represented in FIG. 5 in an exemplary flame arrestor system 118. It has been discovered that the oil cooler 80 may be vulnerable to the possibility of flame in the APU compartment 24 as well as in the exhaust duct 42 and the primary plenum 60, which all comprise possible flame zones. Accordingly, the flame arrestor system 118 includes two flame arrestors 120, 122 disposed on opposite sides of the oil cooler 80. In other embodiments, the flame arrestors 120, 122 may be located a distance away from the protected heat exchanger where space permits.

To protect the oil cooler 80 from possible flame in the APU compartment 24, the flame arrestor 120 is disposed in the cooling air flow stream 78 upstream from the oil cooler 80. The flame arrestor 120 contains a material with the passage-structure matrix 102 and has a flow area 126 larger than that of the oil cooler 80 to reduce pressure loss and to provide sufficient flow. A header 128, which has an open interior is disposed between the flame arrestor 120 and the oil cooler 80 to adapt the different sizes of the oil cooler 80 and the flame arrestor 120, and through which the cooling air flow stream 78 is directed. Any possible flame in the APU compartment 24 that may be carried along with the cooling air flow stream 78 is quenched in the flame arrestor 120 and is prevented from reaching the oil cooler 80.

To protect the oil cooler 80 from possible flame in the exhaust duct 42 and the connected primary plenum 60, the flame arrestor 122 is disposed in the cooling air flow stream 78 downstream from the oil cooler 80. The flame arrestor 122 contains a material with the passage-structure matrix 102 and has a flow area 130 larger than that of the oil cooler 80 to reduce pressure loss and to support sufficient flow. A header 132, which has an open interior, is disposed between the oil cooler 80 and the flame arrestor 122 to adapt the different sizes of the oil cooler 80 and the flame arrestor 122, and through which the cooling air flow stream 78 is directed. Similarly, a header 134, which has an open interior, is disposed between the flame arrestor 122 and the primary plenum 60 to adapt the different sizes of the flame arrestor 122 and the primary plenum 60, and through which the cooling air flow stream 78 is directed. Any possible flame in the exhaust duct 42 and the primary plenum 60 is quenched in the flame arrestor 122 and is prevented from reaching the oil cooler 80. In other embodiments only one of the flame arrestors 120, 122 is included.

As noted above, the flame arrestor system described herein may be employed in a variety of applications. By way of the exemplary embodiment presented for descriptive purposes, the flame arrestor system may have been described herein in the context of an APU application. The current disclosure is not limited to APU applications but is applicable to other applications, such as helicopter propulsion, and others, including non-propulsion systems, where a heat exchanger may be subjected to undesirable flame.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flame arrestor system comprising:
an auxiliary power unit including a gas turbine engine;
a duct channeling a cooling gas flow stream into the auxiliary power unit;
a heat exchanger through which the cooling gas flow stream is directed;
a zone adjacent the heat exchanger in which flame is possible and through which the cooling gas flow stream is directed; and
a flame arrestor containing a passage-structure matrix and disposed between the zone and the heat exchanger,
wherein the flame arrestor is passive with no moving parts,
wherein the flame arrestor includes a structure and passages combination, the passages defined by walls of the structure extending along the gas flow stream and the structure, wherein the walls are configured to quench flame while the passages allow free flow of the cooling gas flow stream through the duct, including in a presence of flame and while the auxiliary power unit remains in operation.

2. The flame arrestor system of claim 1, wherein the cooling gas flow stream is directed through the flame arrestor.

3. The flame arrestor system of claim 1, wherein the walls of the structure comprise elongated tube-like structures.

4. The flame arrestor system of claim 1, wherein the zone comprises an auxiliary power unit compartment.

5. The flame arrestor system of claim 1, wherein the zone comprises an exhaust duct.

6. The flame arrestor system of claim 1, wherein the flame arrestor has a first flow area and the heat exchanger has a second flow area smaller than the first flow area, and comprising a header adapting the flame arrestor to the heat exchanger, diverging laterally out from the duct, expanding from the second flow area to the first flow area, and through which the cooling gas flow stream is directed.

7. The flame arrestor of claim 1, wherein the heat exchanger comprises an oil cooler.

8. The flame arrestor system of claim 1, wherein the flame arrestor is disposed in the cooling gas flow stream upstream from the heat exchanger and comprising a second flame arrestor disposed in the cooling gas flow stream downstream from the heat exchanger.

9. The flame arrestor system of claim 1, wherein the zone comprises an eductor plenum.

10. The flame arrestor system of claim 9, wherein the eductor plenum is configured to educt the cooling gas flow stream through the heat exchanger.

11. The flame arrestor system of claim 1, wherein the passage-structure matrix comprises at least one of a micro-truss foam material and/or a honeycomb material.

12. A flame arrestor system comprising:
an auxiliary power unit including a gas turbine engine;
a duct channeling a cooling gas flow stream into the auxiliary power unit;
a heat exchanger vulnerable to elevated temperature and through which the cooling gas flow stream is directed;
a zone in which flame is possible and through which the cooling gas flow stream is directed; and
a flame arrestor containing a passage-structure matrix configured to quench flame, the flame arrestor disposed between the zone and the heat exchanger,
wherein the cooling gas flow stream is directed through the flame arrestor,
wherein the flame arrestor is passive with no moving parts,
wherein the flame arrestor includes a structure and passages combination, the passages defined by walls of the structure extending along the gas flow stream and the structure,
wherein the walls are configured to quench flame while the passages allow free flow of the cooling gas flow stream through the duct, including in a presence of flame and while the auxiliary power unit remains in operation.

13. The flame arrestor system of claim 12, wherein the walls of the structure comprise uniform elongated channel-like structures.

14. The flame arrestor system of claim 12, wherein the zone comprises an enclosed auxiliary power unit compartment.

15. The flame arrestor system of claim 12, wherein the zone comprises an exhaust duct.

16. The flame arrestor system of claim 12, wherein the flame arrestor has a first flow area and the heat exchanger has a second flow area smaller than the first flow area, and comprising a header adapting the flame arrestor to the heat exchanger, diverging laterally out from the duct, expanding from the second flow area to the first flow area, and through which the cooling gas flow stream is directed.

17. The flame arrestor of claim 12, wherein the heat exchanger comprises an oil cooler.

18. The flame arrestor system of claim 12, wherein the flame arrestor is disposed in the cooling gas flow stream upstream from the heat exchanger and comprising a second flame arrestor disposed in the cooling gas flow stream downstream from the heat exchanger.

19. The flame arrestor system of claim 12, wherein the zone comprises an eductor plenum configured to educt the cooling gas flow stream through the heat exchanger.

20. A flame arrestor system for an auxiliary power unit comprising:
a duct channeling a cooling gas flow stream into the auxiliary power unit;
an oil cooler comprising an aluminum material and through which a cooling air flow stream is directed;
an eductor, configured to educt the cooling air flow stream through the oil cooler and to convey combustion gases to an exhaust duct, wherein the eductor comprises a possible flame zone; and
a flame arrestor containing a passage-structure matrix configured to quench flame, the flame arrestor disposed between the eductor and the oil cooler,
wherein the cooling gas flow stream is directed through the flame arrestor,
wherein the flame arrestor is passive with no moving parts,
wherein the flame arrestor includes a structure and passages combination, the passages defined by walls of the structure extending along the gas flow stream and the structure,
wherein the walls are configured to quench flame while the passages allow free flow of the cooling gas flow stream through the duct, including in a presence of flame and while the auxiliary power unit remains in operation.

* * * * *